UNITED STATES PATENT OFFICE.

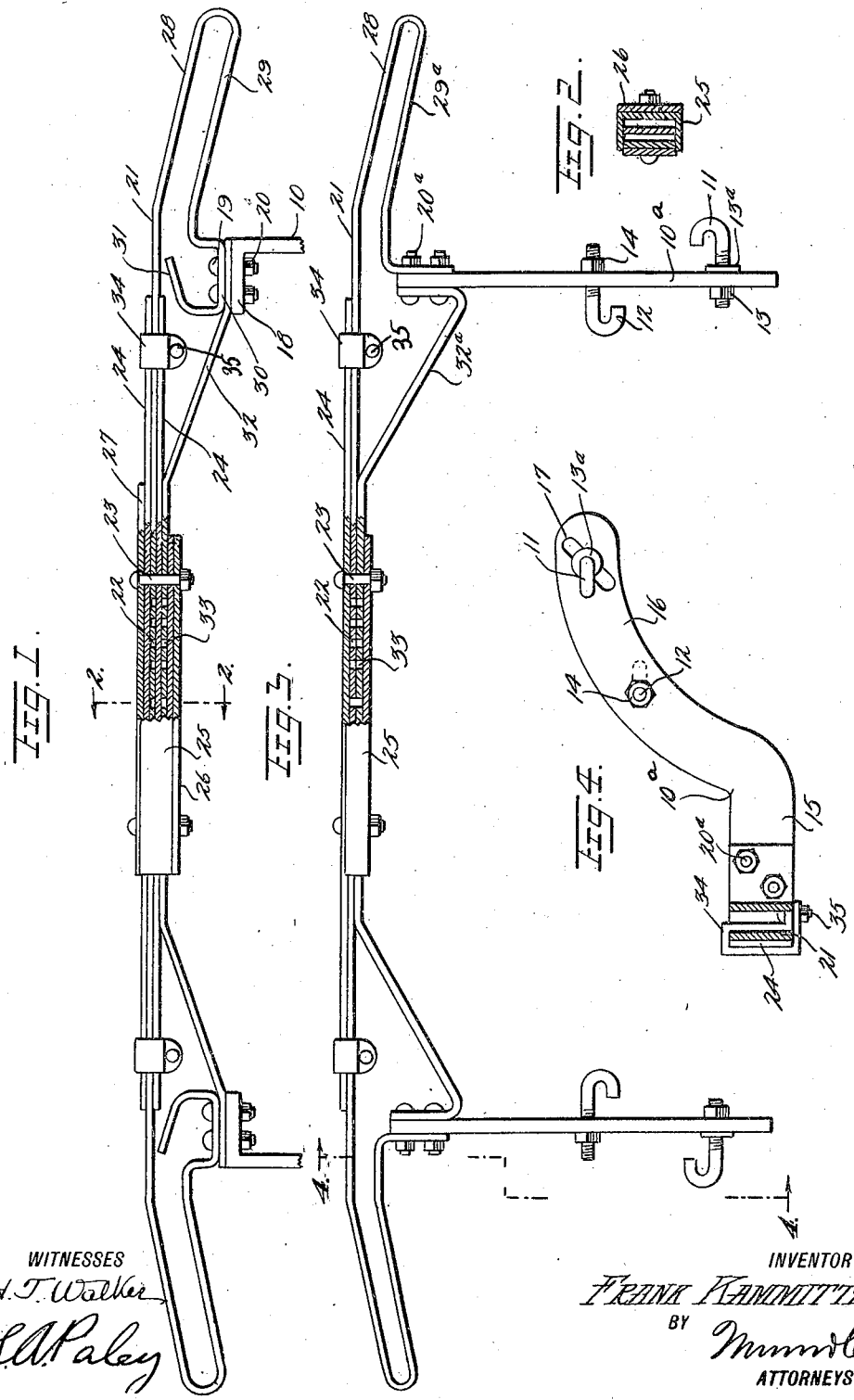

FRANK KAMMITTER, OF NEW YORK, N. Y.

AUTOMOBILE-BUMPER.

1,342,290.  Specification of Letters Patent.  Patented June 1, 1920.

Application filed January 26, 1920. Serial No. 354,034.

*To all whom it may concern:*

Be it known that I, FRANK KAMMITTER, a citizen of the United States, and a resident of the city of New York, borough of Manhattan, county and State of New York, have invented a new and Improved Automobile-Bumper, of which the following is a full, clear, and exact description.

This invention relates to means for preventing damage to an automobile in case of accidental collision with another object, and has reference more particularly to an automobile bumper of the flat spring type.

An object of this invention is to provide an automobile bumper which is secured to the bumper support by a plurality of spring members so that in case of a breakage of one of said members during a collision, the remaining members will still support the bumper and prevent damage to the automobile.

Another object of this invention is to provide an automobile bumper which will be simple of construction and inexpensive to manufacture.

Reference is to be had to the accompanying drawing in which it is understood the drawing represents only one example of the invention with a certain modification, and in which—

Figure 1 is an elevation of the automobile bumper with parts broken away to disclose the construction.

Fig. 2 is a section on the line 2—2 of Fig. 1.

Fig. 3 is an elevation of a modification of the automobile bumper with parts broken away to disclose the construction.

Fig. 4 is a section on the line 4—4 of Fig. 3.

Referring to the accompanying drawing by numerals, 10 indicates the bumper supports which are fixed to any part of the automobile such as the rear or front springs by means of hook bolts 11 and 12, which engage said springs and secure said bumper support thereto by means of nuts 13 and 14 and a screw washer 13ª. The bumper support 10ª may take the form shown in Figs. 3 and 4 in which a horizontal member 15 terminates at one end in an arcuate member 16, said arcuate member being provided with a slot 17 in which is mounted the hook bolt 11 so that said bumper support 10 may be adjusted by longitudinal movement of the hook bolt 11 in said slot 17. In the form shown in Fig. 1 the end 18 opposite the arcuate member 16 of the bumper support 10 is bent at right angles to said bumper support and the resilient springs of the bumper are fixed to these ends 18 by means of bolts 19 and nuts 20. The bumper springs consist of a pair of main springs 21, one end of each being provided with a series of bolt holes 22 in which is placed connecting bolts 23. The ends of the main springs 21 presenting the holes 22, are placed adjacent and are held rigid by means of connecting and reinforcing spring bars 24 one on each side of said main spring 21. This main spring 21 with its reinforcing bars 24 is placed between the legs of a channel bar 25, and the latter is further reinforced by a spring plate 26 on the outside of its web, and a spring 27 adjacent one of the spring bars 24. The ends 28 of the main springs 21 opposite the ends presenting the holes 22 are preferably bent at a slight angle to the general plane of said main spring, and then portions 29 are return bent approximately parallel with the ends 28 and are provided with offset sections 30 which in turn are bent upwardly and outwardly to form auxiliary springs 31 which terminate adjacent the main springs 21 and serve to provide increasing resistance to the bending of the main spring as the strain of the collision becomes greater on said main spring. The bolts 19 extend through the offset section 30 and also extend through a spring 32 which extends obliquely from the support end 18 to a position between one of the reinforcing springs 24 and the web of the channel 25. The end of the spring 32 opposite the support end 18 is also provided with bolt holes 33 which with the bolt holes 22 of the main spring 21 allow adjustment of the distance between the bumper supports 10 to fit different sized automobiles. The bolts 23 extend through the main spring 21, the reinforcing members 24, 26, and 27, the web of the channel 25, and the spring 32 so as to form a very rigid structure midway between the bumper supports 10 where the force of the collision would be greatest, and the maximum deflection obtains. Since each main spring 21 is supported on the bumper support 10 by means of two separate supports, the spring 32 and the main spring section 29, in case of a breakage of one of these members due to a heavy collision the bumper would still be supported on the bumper support 10 by the remaining member so that the car would still be protected from damage. The outer ends of the reinforcing members 24 are fixed to the main spring 21 by means of collars 34 which are clasped together by means of bolts 35.

In the modification shown in Fig. 3, the end of the bumper support 10ᵃ is not bent at right angles, but the main spring section 29ᵃ and the oblique spring 32ᵃ are bolted directly to said bumper support by transverse bolts 20ᵃ. The reinforcing members 26 and 27 are eliminated together with one of the reinforcing members 24. This type is of a somewhat lighter construction, and the auxiliary spring 31 is also eliminated.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. In a bumper, a pair of bumper supports, means for connecting said supports to a vehicle, a pair of main springs, means for securing one end of said main springs together, a plurality of reinforcing springs secured to said main springs, a channel strip secured to said main springs adapted to include said main springs between its legs, and a plurality of supporting members adapted to secure each main spring to a bumper support.

2. In a bumper, a pair of bumper supports, means for connecting said supports to a vehicle, a pair of main springs adjustably secured together at one end, a plurality of reinforcing springs secured to said main springs, a channel strip secured to said main springs adapted to include said main springs between its legs, and a plurality of supporting members adapted to secure each main spring to a bumper support.

3. In a bumper, a pair of bumper supports, means for connecting said supports to a vehicle, a pair of flat main springs positioned with ends adjacent, a plurality of flat reinforcing springs adjacent said main springs, a channel adapted to include said reinforcing and main springs between its legs, means for securing said reinforcing springs, main springs and channel together, a plurality of supporting members adapted to secure each main spring to a bumper support, and spring means associated with said supports adapted to resist the deflection of said main spring during a collision.

FRANK KAMMITTER.